United States Patent [19]

Law

[11] 4,337,841
[45] Jul. 6, 1982

[54] ACCIDENT PREVENTION APPARATUS FOR POWER TAKEOFFS

[76] Inventor: Gerald S. Law, Rubena Lodge, 48 Dromara Rd., Hillsborough, County Down, Northern Ireland

[21] Appl. No.: 128,372

[22] Filed: Mar. 7, 1980

[30] Foreign Application Priority Data

Mar. 7, 1979 [GB] United Kingdom ................ 7907966
May 22, 1979 [GB] United Kingdom ................ 7917750
Jan. 3, 1980 [GB] United Kingdom ................ 8000221

[51] Int. Cl.³ .......................................... B60R 21/00
[52] U.S. Cl. ............................ 180/271; 192/129 A; 200/61.44
[58] Field of Search ............ 180/271, 274, 279, 53 R, 180/53 D, 14.5, 285, 284, 282, 283; 123/198 D, 198 DB; 200/61.41, 61.44; 172/3, 2, 6; 56/10.5, DIG. 15; 192/129 A; 361/179

[56] References Cited

U.S. PATENT DOCUMENTS

| | | | |
|---|---|---|---|
| 2,222,101 | 11/1940 | Johnson | 192/129 A |
| 2,482,630 | 9/1949 | Mastromarino | 200/61.44 |
| 2,598,757 | 6/1952 | Brunsell | 180/271 |
| 2,640,898 | 6/1953 | White | 180/271 X |
| 2,812,397 | 11/1957 | Taylor | 200/61.44 |
| 2,917,126 | 12/1959 | Phillips | 180/285 |

*Primary Examiner*—Joseph F. Peters, Jr.
*Assistant Examiner*—Milton L. Smith
*Attorney, Agent, or Firm*—Nathaniel A. Humphries

[57] ABSTRACT

Accident prevention apparatus for mounting on a machine, tractor or other apparatus having at least one moving part driven by a power source. The accident prevention apparatus comprises, in electrical circuit, an elongate contact-sensitive antenna, movement-sensitive means and means including a solenoid to cut off power from the power source.

The movement-sensitive means includes a mounting and a plate spaced apart and insulated from each other, the antenna being rooted to the mounting to extend therefrom through a hole in the plate and therebeyond to extend in the vicinity of the moving part. Contact with the antenna by the operator's clothing causes it to touch the plate which actuates the solenoid to cut off the power to the machine or to the moving part of the machine.

6 Claims, 9 Drawing Figures

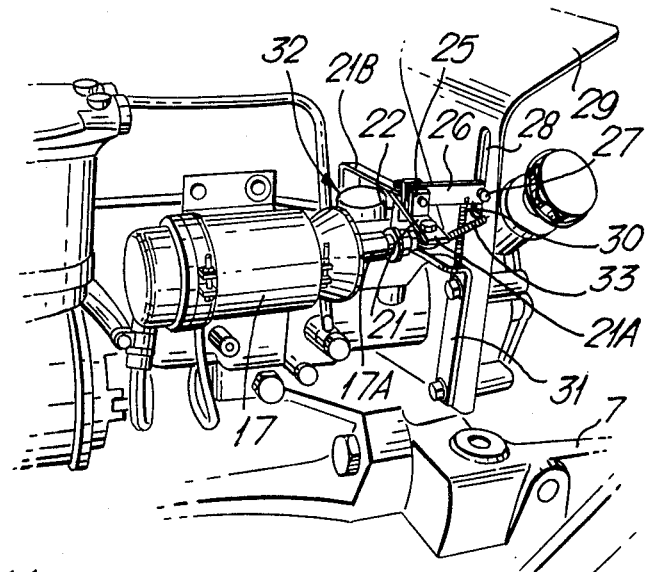
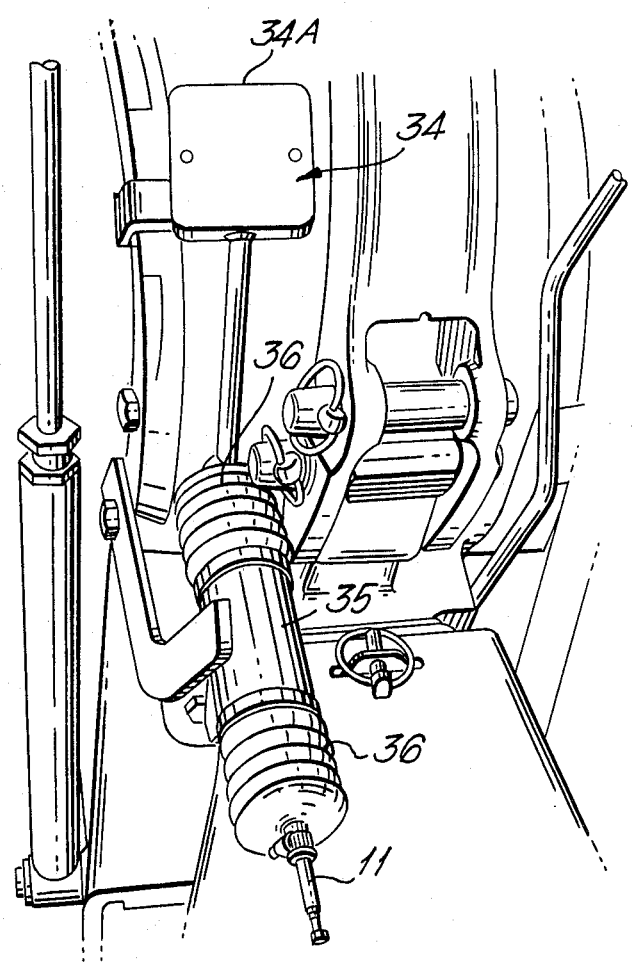

ACCIDENT PREVENTION APPARATUS FOR POWER TAKEOFFS

This invention relates to accident prevention apparatus for use with other apparatus having at least one moving part particularly, but not exclusively, incorporating rotatable drive shafts or power-take-offs or power-take-off shafts connected through a gear box to a power source, the gear box having a gear lever movable between positions in which rotatable movement is transmitted when "in gear" and no rotatable movement is transmitted when in a neutral position. The accident prevention apparatus of the present invention is particularly concerned with an initial object to immobilize and stop rotational movement of such drive or other shafts as soon as possible after actuation of the accident prevention apparatus which is, for example, for use with agricultural tractors.

Heretofore, a disadvantage of working near a power-take-off (p.t.o.) or p.t.o. shaft on an agricultural tractor has been the danger that any loose clothing of a person near to the p.t.o. or to the shaft is liable to be caught up with the p.t.o. or the shaft, and this has been responsible for serious accidents and even fatalities since due to the high speed of revolutions of the p.t.o. and shaft, there is no way the rotation of the shaft or the prime mover can be instataneously stopped and the user has neither the time nor freedom of movement to take any avoiding action to prevent injuries or his death. Guards have been provided to try to overcome this disadvantage, but, in use, have not always been successful in preventing accidents.

It is an object of the present invention to obviate or mitigate the above-described disadvantage.

According to one aspect of the present invention, there is provided accident prevention apparatus for mounting on other apparatus having at least one moving part, the accident prevention apparatus comprising, in electrical circuit, elongate contact-sensitive means to extend in the vicinity of the moving part and movement-sensitive means actuable in response to being touched by said contact-sensitive means to activate means to cut-off power to the or part of the other apparatus whereby to immobilise the or part of the other apparatus.

According to a second aspect of the present invention, there is provided an apparatus having at least one moving part and mounting an accident prevention apparatus as described in the preceding paragraph.

According to a third aspect of the present invention, there is provided accident prevention apparatus for mounting on the other apparatus having at least one moving part, the accident prevention apparatus comprising, in electrical circuit, means to cut off power to an internal combustion engine driving the or part of the other apparatus, said cut-off means being activated by an elongate contact-sensitive means which extends in the vicinity of the moving part touching a movement-sensitive means.

Preferably, the elongate contact-sensitive means is an antenna which is length-adjustable.

Preferably also, the antenna is rooted to a mounting forming part of the movement-sensitive means which also has at least a plate having a hole therein and provided adjacent to the mounting on the same side of the mounting as the antenna which is arranged to extend through said hole and beyond, the plate and antenna being connected in an electrical circuit so that by contact of the antenna with the plate a circuit is completed to actuate a power cut-off means to stop movement of the driven moving part.

Preferably also, the means for cutting off power comprises at least one solenoid in circuit with the contact-sensitive means and movement-sensitive means, the solenoid, on being energised, immediately causing the energy from the power source to cease.

An embodiment of the present invention will now be described by way of example, with the apparatus fitted to an agricultural tractor and with reference to the accompanying drawings, in which:

FIG. 3 is a side view of the tractor showing a second solenoid;

FIG. 5 is a perspective view of the rear of the tractor showing an alternative form of contact-sensitive means and movement-sensitive means;

Accident prevention apparatus comprises an elongate contact-sensitive means in the form of a length-adjustable antenna 11 which is rooted to a mounting 8 which forms part of a movement-sensitive means to detect movement of said antenna in any direction at right angles to its longitudinal axis and means to cut off energy from a power source, in this embodiment the internal combustion engine of the tractor.

Figure 1:
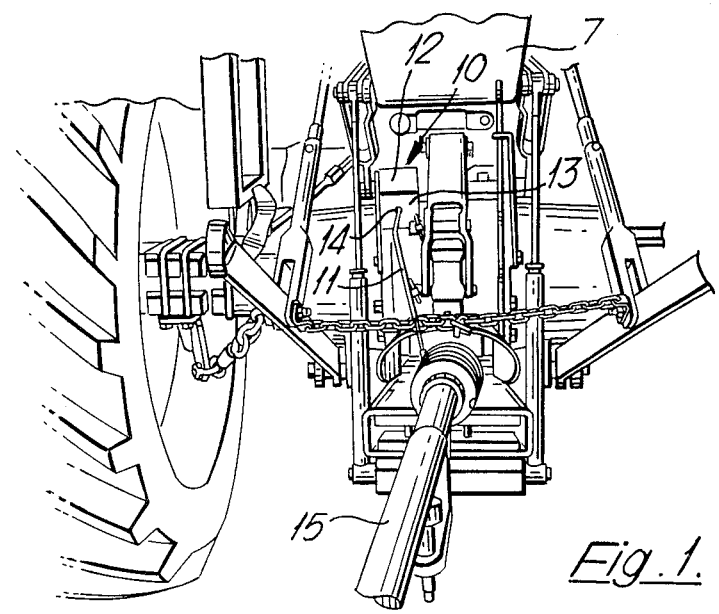
FIG. 1 is a rear view of a tractor showing contact-sensitive means and movement-sensitive means of an accident prevention apparatus according to the present invention.

With reference to FIG. 1, the movement-sensitive means also comprises a casing 12 for housing the mounting 8 insulated therefrom with the antenna 11 extending through a hole 14 in a plate 13 at the pertaining side of the casing 12 and therebeyond to overlie a p.t.o. shaft. The hole 14 has a diameter slightly greater than that of the antenna 11, and is not touched by the antenna in its normal position. The antenna 11 is length-adjustable so that it can be extended when a drive or p.t.o. shaft 15 is fitted to the p.t.o. and retracted when no shaft 15 is fitted. The antenna 11 and casing 12 are connected respectively through an open electric circuit to the opposite terminals of an electric current supply.

Figure 2:
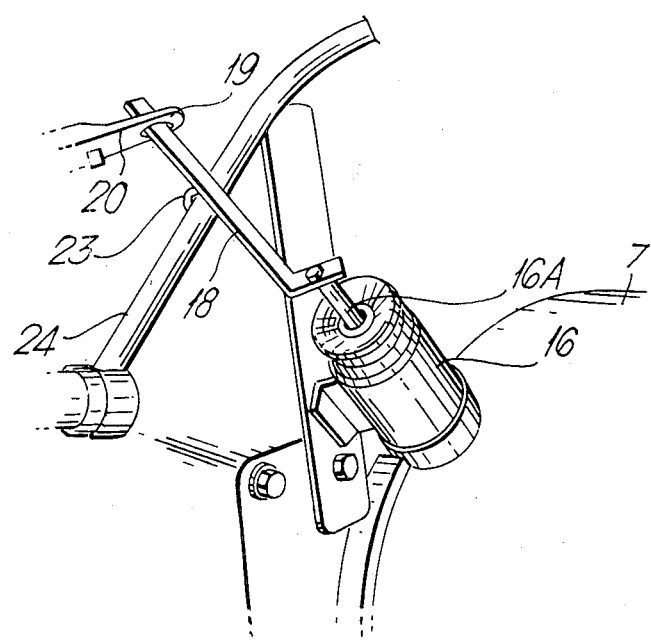
FIG. 2 is a side view of the tractor showing a first solenoid.

The means to cut off energy from a power source comprises a first solenoid 16 (FIG. 2) and a second solenoid 17 (FIG. 3). The first solenoid 16 has a piston 16A whose outer end is attached to a guide 18 sliding in an eye 19 of a bar 20 attached to the tractor t. A hook 23 opening out in the direction of the solenoid 16 extends laterally from the side of the guide 18 on the solenoid side of the bar 20. The hook 23 is engaged around the gear lever 24 whereby when the piston 16A is energized and retracts, it pulls the lever 24 into neutral. The second solenoid 17 has a piston 17A whose outer end is attached to one end 21A of a bell-crank lever 21 fulcrummed at 22. Between the fulcrum and the piston connection on the one end 21A of the lever, two lugs 25, spaced apart on said lever, upstand and between which one end of a catch 26 is freely pivoted. The other end of the catch 26 moves in a vertical slot 28 provided in a plate 29, and has a stop 27 extending laterally therefrom to prevent the catch, when in an upwardly inclined position from moving downwardly in the slot 28. When the catch 26 is upwardly inclined, the solenoid 17 is de-energised, and its piston 17A is extended. A tension spring 30 connects the catch 26, adjacent to the stop 27 and on the same side of the plate 29 as it is pivoted, to a bracket 31 secured to the plate 29. The other arm 21B extends towards the injector pump or carburettor 32 of the tractor. When the solenoid 17 is energized, the piston 17A retracts, the lever 21 moves about its fulcrum 22 and the other arm 21B moves to choke the injector pump or carburettor and stop the engine. To make sure the engine is stopped, and does not restart, the catch 26 is provided, and on movement of the lever, the catch 26 moves down the slot 28 under the biasing of the spring and also under gravity into a locking, downwardly inclined position, thereby locking the lever in its piston-retracted position. The catch 26 has to be manually moved out of its locked position and reset before the tractor can be used again. A tension spring 33 is provided, when the catch 26 is not locked, to hold lever 21 in a non-operative position and the piston 17A extended. The spring 33 is connected between plate 29 and the outer end of the lever 21A.

Figure 4:
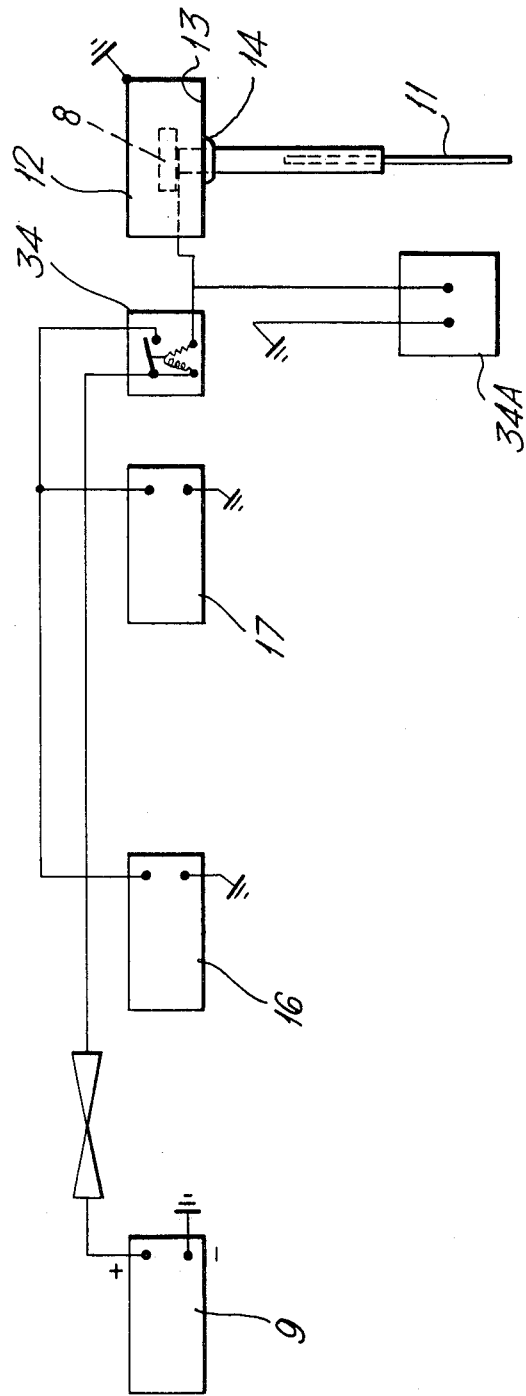
FIG. 4 is a block circuit diagram.

The switch, and solenoids are in an open electrical circuit powered by a battery 9, a circuit diagram for which is shown in FIG. 4, the diagram also showing a fused relay 34 and remote control socket 34A to be described hereinafter with reference to FIG. 5.

In use, with the apparatus fitted to the tractor, any movement of the antenna 11 caused by loose clothing or any manual action, closes the circuit by the antenna 11 touching the plate 13. This causes both solenoids 16 and 17 to retract and actuate the guide 18 and lever 21 in the manner above-described. The mounting 8 is of resilient material to allow the antenna 11 to return to its pretouching position.

The accident prevention apparatus can be mounted on any apparatus having moving parts and which can very quickly entrap a person. Such apparatus are, for example, a lathe, a stone-crusher, apparatus with belt-driven pulley or wheels, a threshing or hammer mill.

A waterproof covering, for example, a rubber grommet can be provided over the casing and clipped around the antenna 11 adjacent to the plate 13 thereby to prevent corrosion, and to keep out dust and dirt.

FIG. 5 shows an alternative form of contact-sensitive means and movement-sensitive means in which a fused relay 34 is provided separate from the movement-sensitive means which is in the form of a tubular casing 35 housing the mounting and having the plate 13 mounted at one end thereof. Both ends of the tubular casing 35 have rubber grommets 36. To enable a second movement-sensitive means to be mounted at the other end of a p.t.o. shaft, a waterproof socket point 34A is provided on one side of the relay unit, the cable from the second movement-sensitive means, when fitted, overlying the p.t.o. shaft and the antenna of the second movement-sensitive means, when both antennas are extended, being arranged to be located above or below the antenna of the first movement-sensitive means so that the antennas do not touch each other and activate the power cut-off means unnecessarily.

Figure 6A:
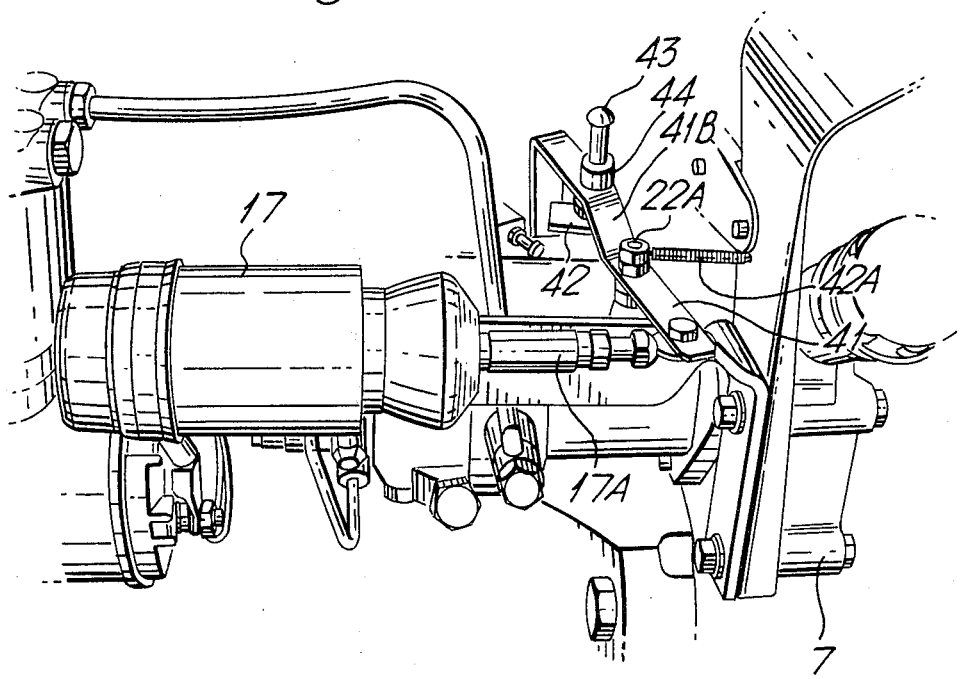
FIGS. 6A and 6B are side views of the tractor both showing an alternative form of the second solenoid in the open and closed positions respectively.
Figure 6B:
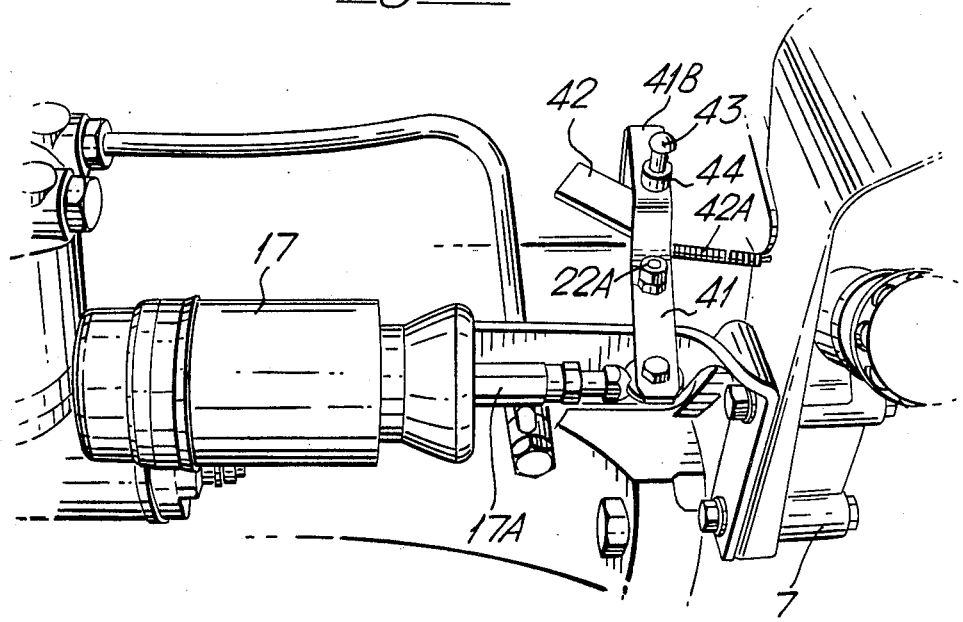

In FIGS. 6A and 6B, an alternative form of a second solenoid is shown in which the piston 17A is pivotally connected to a bar lever 41 fulcrummed at 22A and the other end 41B of the lever connects, by abutment, with choke plate 42 when the piston 17A is retracted as in FIG. 6B to choke the carburettor or injector pump. When the solenoid 17 is de-energised and lever 41 returns to its original position, tension spring 42A returns the choke plate to its original position. To lock the choke plate 42 in its choking position, a spring-biased pin 43 is provided for upright movement in a boss 44 which upstands from around a hole in the lever 41, the pin being biased downwardly into engagement with the choke plate 42 after it has been moved by the lever 41 into its choking position thereby to retain it in its choking position until the pin is manually lifted. This movement enables the lever 41 to return to its original position, as also the choke plate 42.

Figure 7B:
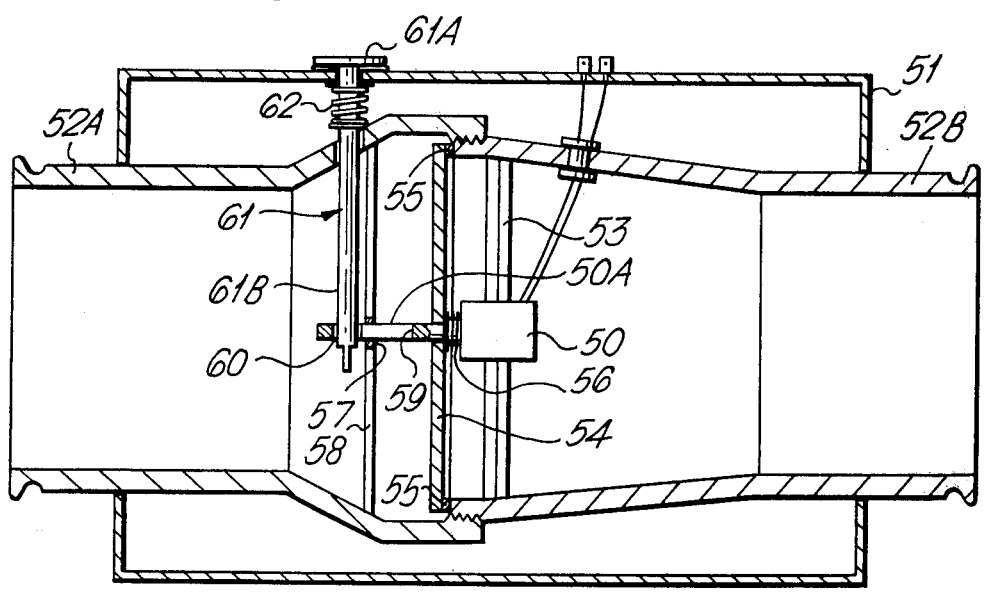
FIGS. 7A and 7B are cross-sectional views of a device for mounting in an air induction system of an internal combustion engine of a tractor showing a further alternative form of the second solenoid in the open and closed positions respectively.
Figure 7A:
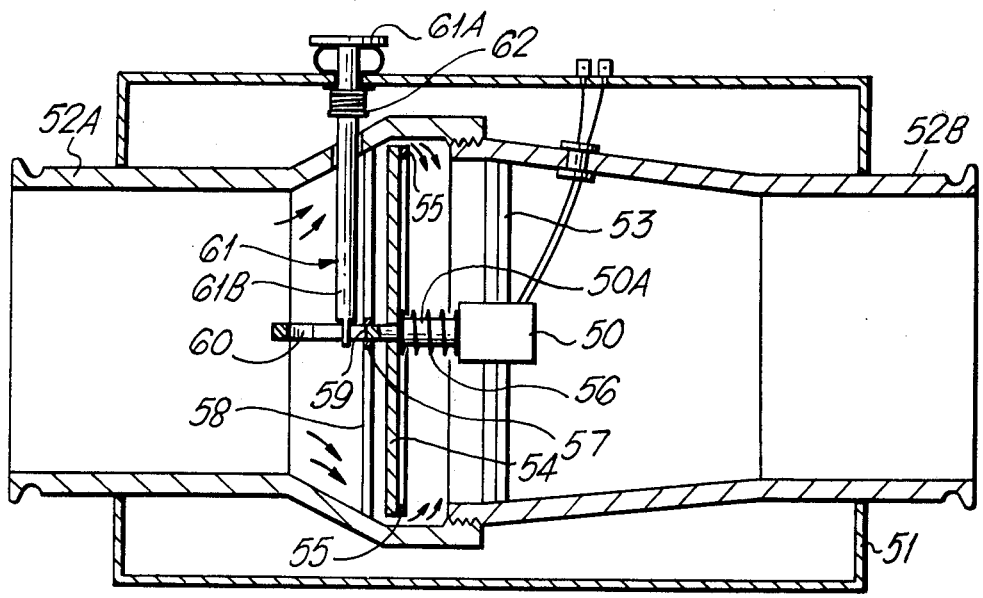

FIGS. 7A and 7B show a device for mounting in an air induction system of an internal combustion engine of the tractor, the device incorporating a further alternative form of second solenoid 50. The device comprises a box 51 within which a tubular passage is provided formed from pipes 52A and 52B to be located respectively at the air intake and engine side of the air induction system. Solenoid 50 is carried by a support bracket 53 adjacent to the end of pipe 52B in threaded engagement with pipe 52A with the spindle 50A of the solenoid extending axially of the passage. A sealing disc 54 is mounted axially on the spindle 50A, the disc 54 having a sealing ring 55 of deformable material mounted around the edge of the disc 54 on the side thereof facing the pipe 52B, the ring 55 being for abutment against the end of pipe 52B, there being a spring 56 between the solenoid 50 and disc 54. The spindle 50A extends beyond the disc 54, is journalled in a bearing 57 carried by a support bracket 58 mounted adjacent to the end of the pipe 52A contiguous with pipe 52B. Air is free to pass through bracket 58 and circumferentially between the disc 54 and the pipe 52A into pipe 52B. A slot 59 is provided lengthwise of the outer end of the spindle 50A beyond the bracket 58 and adjacent to the outer end of the spindle 50A opens into a hole 60. A locking plunger 61 is provided, the head 61A of which is located on the outside of the box 51 and a spring 62 is provided between the box 51 and pipe 52A. The inner end of the shank 61B of the plunger 61 is reduced in diameter to sit in the slot 59, and is held in this seating position by the spring 62 which urges the shank 61B towards the spindle 50A such that in operation when the solenoid 50 is energised causing the spindle 50A to retract into the solenoid body, the shank 61B enters the hole 60 as it aligns with said shank 61B. In this position, the disc 54 seats against the end of the pipe 52B, the ring 55 sealing the abutment to close off pipe 52B against any intake of air into said pipe 52B to stifle the engine. Also, the shank 61B engaged in hole 60 prevents the spindle 50A extending out from the solenoid body under the influence of spring 56.

This situation exists until manual removal of the plunger 61 from engagement with hole 60 of the spindle 50A at which time the disc 54, and spindle 50A return to their above former positions.

The above described accident prevention apparatus is for use in addition to a guard for the p.t.o.

I claim:

1. An apparatus having at least one moving part driven through a gear box by an internal combustion engine, accident prevention apparatus comprising in electrical circuit, cut-off means to cut off transmission of power from the internal combustion engine driving the moving part so as to stop the moving part, elongated contact-sensitive means extending in the vicinity of the moving part having a portion positioned adjacent a movement-sensitive means, the cut-off means being activated when the elongated contact-sensitive means is deflected so as to cause it to touch the movement-sensitive means, the transmission cut-off means comprising at least one solenoid which on being energized in response to contact of the movement-sensitive means and the elongated contact-sensitive means mechanically moves a gear lever of the gear box to a neutral position immediately causing power from the engine to cease to be transmitted to the moving part.

2. Accident prevention apparatus according to claim 1, wherein the elongated contact-sensitive means is an antenna which is length adjustable to extend along and in the vicinity of an elongated moving part.

3. Accident prevention apparatus according to claim 2, wherein the movement-sensitive means comprises at least a mounting and a plate, the plate being spaced and insulated from the mounting and having therein defined a hole, the antenna being attached on one end mounting to extend through and beyond the hole in the plate, the plate and antenna being connected in circuit with electric current supply whereby, when the antenna is moved by contact therewith it touches the plate surrounding the hole to activate the power cut-off means to stop movement of the moving part.

4. Accident prevention apparatus according to claim 1, wherein a waterproof socket is provided in said electrical circuit to enable a second antenna and a second movement-sensitive means to be fitted longitudinally in the vicinity of the other elongated moving part.

5. Accident prevention apparatus according to claim 1, wherein the cut-off means includes a second solenoid adapted on deflection of contact-sensitive means to actuate choke means for the engine, and further including manually-resettable choke means and locking means to automatically lock the choke means in locking position.

6. Accident prevention apparatus according to claims 1, 2, 3, 4, and 5, wherein the engine is mounted on a tractor.

* * * * *